Figure 1:
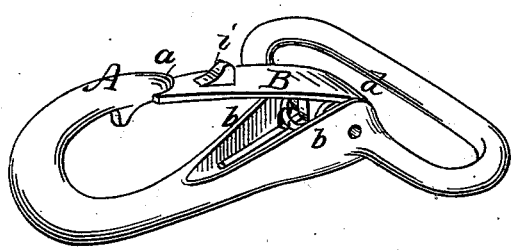

E. KEMPSHALL.
Snap-Hooks.

No. 212,950. Patented Mar. 4, 1879.

Witnesses:
Philip J. Larner
H. Bartle

Inventor:
Eleazer Kempshall
By McOmd
Attorney

UNITED STATES PATENT OFFICE.

ELEAZER KEMPSHALL, OF NEW BRITAIN, CONNECTICUT.

IMPROVEMENT IN SNAP-HOOKS.

Specification forming part of Letters Patent No. 212,950, dated March 4, 1879; application filed January 18, 1879.

*To all whom it may concern:*

Be it known that I, ELEAZER KEMPSHALL, of New Britain, in the county of Hartford and State of Connecticut, have invented certain new and useful Improvements in Snap-Hooks; and I do hereby declare that the following specification, taken in connection with the drawings furnished and forming a part of the same, is a clear, true, and complete description of my invention.

I seek through my said improvements economy in construction, durability, efficiency, and a capacity in snap-hooks to resist such accidental releasing influences as they are in practice liable to encounter.

My said improvements are in part particularly applicable to that class of snap-hooks which have rigid tongues, and other portions thereof are applicable also to such hooks as have flexible tongues composed of spring metal.

The main feature of my invention consists in the combination, with a hook provided with an eye and a shank which is split longitudinally adjacent to the eye, of a snap-tongue provided with a pivot integral therewith, and a controlling-spring which encircles the pivot. The shank split longitudinally adjacent to the eye affords a free clearance for water or dirt liable to enter the spring-socket, as has to more or less extent been heretofore provided for. The split in the shank at the point named also admits of such a normal lateral expansion of the shank that when coincident portions thereof are drilled for receiving the tongue-pivots the tongue with integral pivots may be inserted and secured in position by compressing the shank laterally.

It has heretofore been proposed to construct snap-hooks with a longitudinally-channeled shank and side ears capable of being bent outward and then inward to secure a tongue with integral pivot, located centrally on the tongue; but this construction involves the use of a longer shank than is desirable, a flat spring, and a spring-socket, which is liable to retain obstructive matter.

Snap-hooks have also been heretofore made having a slot in the shank which extended into the eye to admit of the use of a detachable tongue held in position solely by its spring, open seats being provided in the shank for the tongue-pivots. The tongue of my hook is practically inseparable from the shank, and can only be removed after the shank has been bodily expanded.

While the parts recited and the construction indicated constitute as a whole a desirable embodiment of the main portion of my improvements, I am well aware that the pivot-encircling spring described may be dispensed with, and some one of the many other well-known forms thereof substituted, without detracting from the merits due to the combination, with a hook provided with an eye and a shank split longitudinally adjacent to the eye, of a rigid tongue confined to the shank by pivot-holes, and provided with integral pivots, and any suitable spring for maintaining it in proper relations with the tip of the hook; and this combination constitutes another portion of my invention.

Another feature of my invention relates to the combination, with a hook and a rigid tongue having two side pivots, of a duplex spiral spring which encircles both pivots, and has its connected end in bearing contact with the under side of the tongue.

So far as my knowledge extends the first duplex spring employed in this connection is shown and described in Letters Patent of the United States No. 184,873, and issued to myself and William Nash, November 28, 1876. As therein shown the connected end of the duplex spring takes its bearing by being hooked upon a catch on the shank of the hook at the rear of the tongue and behind its pivot.

In accordance with my present invention, the connected end of the duplex spring, and also the free ends thereof, are both in front of the pivot, and the spring is therefore much more free to assume the varied positions incident to working the tongue, and consequently more durable. The free ends of the spring occupy the spring-socket in the shank, and are protected against abrasion and injury. The connected end of the spring, being rounded, has a broad flat bearing against the tongue, and requires no spring-socket therein for its protection, as is necessary when the end of a single spring is located against the tongue, or when as shown in the Letters Patent aforesaid.

The value of the duplex spring is obvious, as under no circumstances can a single break of the spring render the snap-hook inoperative.

It will be readily seen that this portion of my invention is of equal value, whether the snap-hook have a spit or a solid shank, or a tongue which has integral or inserted pivots.

It is well known that in swinging or throwing, for instance, a chain or rope connected by a link or ring to a chain or rope which is provided with a snap-hook, the link or ring, by a side twisting movement, is liable to depress the tongue and become disengaged.

For obviating, in part, this liability, some snap-hooks have heretofore been provided with an inward projection near the tip of the hook, and also with overhanging portions of the shank under the name of "guards," which partially inclose the tongue near its pivoted end. Other hooks have heretofore been provided with what has been termed a "guard-plate," attached to the upper side of the shank near the eye and overhanging the tongue, projecting on each side thereof laterally; and this class of hooks have usually had a spring-metal tongue secured to the under side of this guard-plate. My improvement in this connection consists in the combination, with a hook, of a snap-tongue which has a guard projecting from its outer surface. This guard, applied in accordance with my invention, is a more complete protection to an undue and accidental movement of the tongue, which would permit the release of a ring or loop from the hook, than either the overlying plate or the inward projection near the tip of the hook to which I have referred, and its full operative value would be attained if applied to prior hooks constructed as stated.

To more particularly describe the several features of my invention, I will refer to the accompanying drawings, in which—

Figure 2:
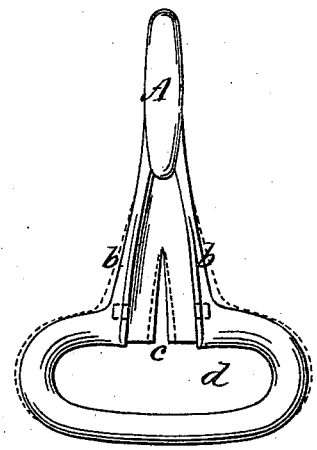
Figure 3:
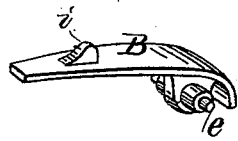
Figure 4:
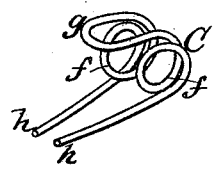

Figure 1 represents, in perspective, a snap-hook embodying all of my present improvements. Fig. 2 represents, in front view, the hook with its tongue and spring detached, the dotted lines indicating its normal condition prior to the reception of the tongue. Fig. 3 represents the tongue detached and in perspective. Fig. 4 represents the duplex spring detached.

The hook A has a shank recessed to form the spring-socket $a$ and the ear-flanges $b$. It is split longitudinally, affording the slot $c$, which opens into the eye $d$ of the hook. When made of cast metal, the pattern therefor is wider than the finished hook adjacent to the junction of its shank and eye, and the slot $c$ is also somewhat wider at its entrance. When forged with special tools, the shank is widened in a similar manner. The shank at the ear-flanges is drilled while in its expanded condition for the reception of the tongue-pivots.

The tongue B, as shown, is of the flat rigid class, has its side pivots, $e$, integral therewith, and is preferably composed of cast metal. The tip of the hook is recessed to receive the flat tip of the tongue, instead of the beveled joint extensively used. The rear end of the tongue is curved or bent so as to conform to the outline of the shank adjacent to the eye, and present a smooth symmetrical finish.

The duplex spring C is composed of a single length of wire, bent to afford two arms, each of which is coiled to form a spring, $f$, one for each of the side pivots of the tongue. The connected end $g$ of the duplex spring and the individual ends $h$ thereof are, when the spring is in position, located in front of the pivots, the connected end having its bearing against the under side of the tongue. The separate ends of the spring occupy the spring-socket in the shank on each side of the slot $c$. The three ends of the duplex spring are equally unconfined, and are free to make such movement (more or less) as may be incident to the movement of the tongue, and it operates as a single spring without losing its capacity to properly control the tongue, even after it has been broken at any one point. The spring is applied to the tongue-pivot and the tongue introduced between the ears of the shank, which is then compressed, causing the pivots to occupy their respective pivot-holes.

The hook near its tip is provided with an inward projection, which serves as a guard under some conditions, substantially as heretofore.

The snap-tongue is provided in a novel manner with a guard, $i$, which is mounted on the outer side of the tongue and projects therefrom.

It will be seen that when both are employed the full measure of security is attained, because both will serve at the same time to resist the twisting strain of a link, otherwise liable to depress the tip of the tongue; but the guard on the tongue alone may generally be solely relied upon, because it is outside of the hook, and occupies a position which enables it to arrest the depressing action of a link upon the front side of the tongue.

It will readily be seen, also, that if the guard on the tongue fails to afford a bearing for a link or ring under the circumstances stated, the link, when it slips from the guard, will have a tendency to pass over the tip of the tongue without depressing it.

By properly proportioning the size of the tongue-guard and properly locating it on the tongue, it will in no manner decrease the size of the entrance to the snap-hook. I prefer that the tongue-guard be integral with the tongue; but it may be riveted thereon, if desired, and the best results will be attained if the side of the guard farthest from the tip of the tongue be nearly at right angles to the outer surface thereof. If spring-metal tongues are used, the guard may be riveted thereto; or it may be formed by bending a portion of the metal at right angles upon itself at the proper point.

It will be seen that a snap-hook embodying all of my improvements may be economically constructed, that all of the moving or working parts are of a durable character, and that the liability of the release of a ring or hook therefrom is reduced to a minimum.

Having thus described my invention, I claim as new and desire to secure by Letters Patent—

1. The combination, with a hook provided with an eye, and a shank which is split longitudinally adjacent to the eye, of a tongue provided with a pivot integral therewith, and a controlling-spring which encircles the pivot, substantially as described.

2. The combination, with a hook provided with an eye, and a shank which is split longitudinally adjacent to the eye, of a rigid tongue confined to the shank by pivot-holes therein, and provided with integral pivots and a spring for controlling the tongue, substantially as described.

3. The combination, with a hook and a rigid tongue having two side pivots, of a duplex spring which encircles both pivots, and has its connected end in bearing contact with the under side of the tongue, substantially as described.

4. The combination, with a hook, of a snap-tongue which has a guard, $i$, projecting from its outer surface, substantially as described.

ELEAZER KEMPSHALL.

Witnesses:
LYMAN S. BURR,
THOMAS R. HICKS.